(12) United States Patent
Shibaike

(10) Patent No.: US 8,286,096 B2
(45) Date of Patent: Oct. 9, 2012

(54) DISPLAY APPARATUS AND COMPUTER READABLE MEDIUM

(75) Inventor: Rei Shibaike, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 837 days.

(21) Appl. No.: 11/937,160

(22) Filed: Nov. 8, 2007

(65) Prior Publication Data

US 2008/0244454 A1    Oct. 2, 2008

(30) Foreign Application Priority Data

Mar. 30, 2007   (JP) ................................. 2007-090364

(51) Int. Cl.
*G06F 3/048* (2006.01)
*G06F 3/041* (2006.01)
*G06F 3/00* (2006.01)
*G06F 17/00* (2006.01)

(52) U.S. Cl. ........ 715/834; 715/835; 715/751; 715/783; 715/788; 715/810; 715/852; 345/156; 345/173; 345/649; 345/650; 348/E5.105

(58) Field of Classification Search ................ 715/834, 715/751; 345/649, 650
See application file for complete search history.

(56) References Cited

U.S. PATENT DOCUMENTS

| | | | | |
|---|---|---|---|---|
| 5,511,148 | A * | 4/1996 | Wellner ........................ | 358/1.6 |
| 5,596,699 | A * | 1/1997 | Driskell ........................ | 715/834 |
| 5,798,760 | A * | 8/1998 | Vayda et al. .................. | 715/834 |
| 6,011,542 | A * | 1/2000 | Durrani et al. ................ | 345/156 |
| 6,618,063 | B1 * | 9/2003 | Kurtenbach .................. | 715/834 |
| 6,690,402 | B1 * | 2/2004 | Waller et al. .................. | 715/850 |
| 6,791,530 | B2 * | 9/2004 | Vernier et al. ................ | 345/156 |
| 7,036,090 | B1 * | 4/2006 | Nguyen ....................... | 715/834 |
| 7,069,516 | B2 * | 6/2006 | Rekimoto ..................... | 715/757 |
| 7,210,107 | B2 * | 4/2007 | Wecker et al. ................ | 715/863 |
| 7,437,685 | B2 * | 10/2008 | Yu et al. ........................ | 715/853 |
| 7,546,550 | B1 * | 6/2009 | Buck ............................ | 715/834 |
| 7,730,425 | B2 * | 6/2010 | de los Reyes et al. ........ | 715/835 |
| 2004/0046784 | A1 * | 3/2004 | Shen et al. .................... | 345/733 |
| 2004/0212617 | A1 * | 10/2004 | Fitzmaurice et al. ......... | 345/440 |
| 2005/0086611 | A1 | 4/2005 | Takabe et al. | |
| 2005/0183035 | A1 * | 8/2005 | Ringel et al. ................. | 715/811 |
| 2005/0235317 | A1 * | 10/2005 | Green ............................ | 725/46 |
| 2006/0156249 | A1 * | 7/2006 | Blythe et al. ................. | 715/781 |
| 2007/0220444 | A1 * | 9/2007 | Sunday et al. ................ | 715/788 |
| 2007/0256029 | A1 * | 11/2007 | Maxwell ....................... | 715/834 |

(Continued)

FOREIGN PATENT DOCUMENTS

JP         A-6-202784         7/1994

(Continued)

OTHER PUBLICATIONS

Translation of Sep. 20, 2011 Office Action issued in Japanese Patent Application No. 2007-090364.

*Primary Examiner* — Jordany Nunez
(74) *Attorney, Agent, or Firm* — Oliff & Berridge, PLC

(57) ABSTRACT

The display apparatus is provided with a generating unit that generates a menu image in which selection items of a menu are geometrically arranged; and a controller that makes the menu image displayed on a screen of a display and that makes positions of the selection items in the menu image dynamically changed.

16 Claims, 14 Drawing Sheets

U.S. PATENT DOCUMENTS

| | | | | |
|---|---|---|---|---|
| 2007/0271528 | A1* | 11/2007 | Park et al. | 715/810 |
| 2007/0300182 | A1* | 12/2007 | Bilow | 715/799 |

FOREIGN PATENT DOCUMENTS

| | | |
|---|---|---|
| JP | A-8-123647 | 5/1996 |
| JP | A-2000-283782 | 10/2000 |
| JP | A 2004-259247 | 9/2004 |
| JP | A-2004-326189 | 11/2004 |
| JP | A 2006-139615 | 6/2006 |

* cited by examiner

FIG.5

| IMAGE ID | INFORMATION ON COORDINATES | FLAG | DOCUMENT ID |
|---|---|---|---|
| Q001 | (E1x,E1y),(F1x,F1y),(G1x,G1y) | 0 | R001 |
| Q002 | (E2x,E2y),(F2x,F2y),(G2x,G2y) | 0 | R002 |
| Q003 | (E3x,E3y),(F3x,F3y),(G3x,G3y) | 1 | R003 |
| ⋮ | ⋮ | ⋮ | ⋮ |

DISPLAY APPARATUS AND COMPUTER READABLE MEDIUM

CROSS REFERENCE TO RELATED APPLICATION

This application is based on and claims priority under 35 USC §119 from Japanese Patent Application No. 2007-90364 filed Mar. 30, 2007.

BACKGROUND

1. Technical Field

The present invention relates to a display apparatus for displaying a menu and a computer readable medium storing a program causing a computer to execute a process for image processing.

2. Related Art

SUMMARY

According to an aspect of the invention, there is provided a display apparatus including: a generating unit that generates a menu image in which selection items of a menu are geometrically arranged; and a controller that makes the menu image displayed on a screen of a display, and that makes positions of the selection items in the menu image dynamically changed.

BRIEF DESCRIPTION OF THE DRAWINGS

Exemplary embodiment(s) of the present invention will be described in detail based on the following figures, wherein:

FIG. 5 is a diagram illustrating a specific example of information stored in the image position storing unit in the case where the electronic documents (object images) are displayed as shown in FIG. 4;

DETAILED DESCRIPTION

Hereinafter, with reference to the attached drawings, a detailed description will be given to the preferred embodiment for carrying out the present invention (hereinafter, referred to as the exemplary embodiment).

<A Mechanism of a Table Type Display Apparatus>

In the present exemplary embodiment as an example of a display apparatus, a table type display apparatus to be surrounded by plural users for discussion or the like is used. First of all, a description will be given to a mechanism of the table type display apparatus.

Figure 1:
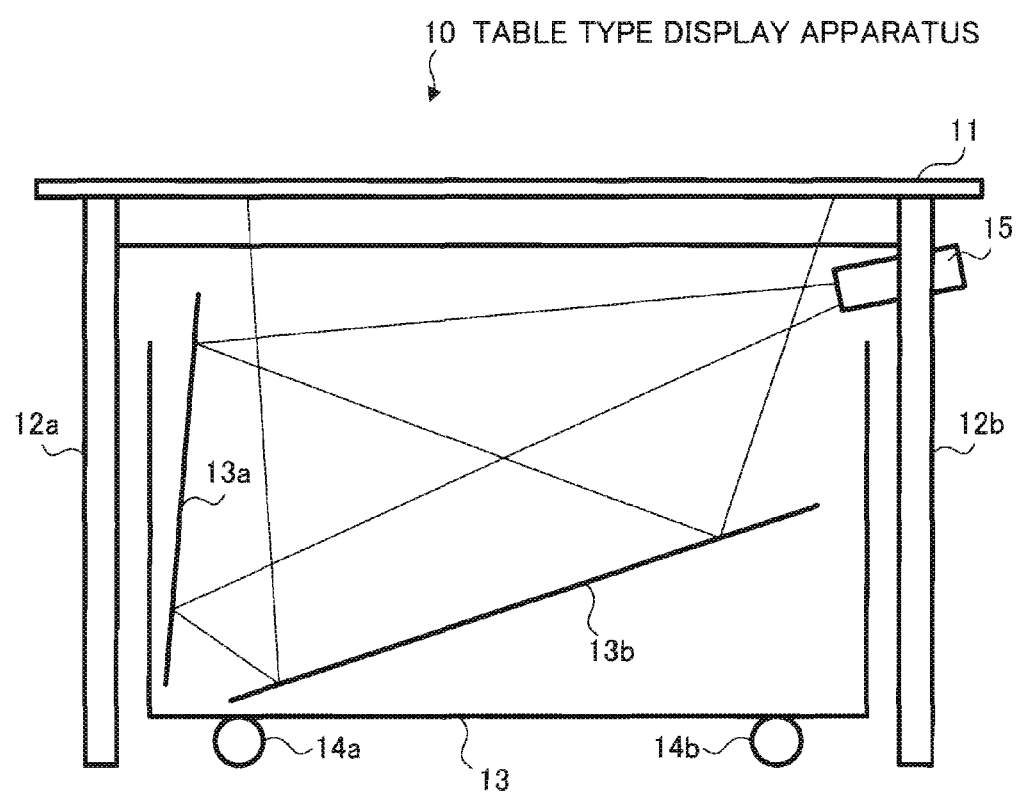
FIG. 1 is a cross sectional view of the table type display apparatus according to the present exemplary embodiment.

FIG. 1 is a cross sectional view of the table type display apparatus according to the present exemplary embodiment.

As shown in the figure, the table type display apparatus 10 is provided with a tabletop 11 serving as a working table for discussion or the like, and leg portions 12a to 12d that support the tabletop 11. The table type display apparatus 10 is also provided with a projection unit 13 that projects an image from a back surface to the tabletop 11, casters 14a to 14d that support and freely move the projection unit 13, and a projector 15 that projects an image to be projected to the tabletop 11. However, since FIG. 1 is a cross sectional view, the leg portions 12c and 12d, and the casters 14c and 14d are not shown in the figure. Although not shown in FIG. 1, there is an arithmetic unit that performs various kinds of arithmetic processing and outputs an image to be displayed on a screen of the tabletop 11 through the protector 15 and the projection unit 13. The arithmetic unit may be provided as a built-in computer of the table type display apparatus 10, or may be realized as an external computer and connected to the projector 15.

As the tabletop 11, for example, a table top with around shape is used so that users may stand at arbitrary positions around the tabletop 11 and join the discussion or the like. Further, an opaque white semi-transparent filter is adhered to a substrate such as a glass plate so as to function as a display screen that displays an image projected by the projection unit 13. That is, in the present exemplary embodiment, the tabletop 11 is used as an example of a display of the present invention. Furthermore, the tabletop 11 has a function as a touch panel that detects operation by users to the displayed image. Here, the touch panel may be realized by covering a surface of the tabletop 11 with a transparent screen in which elements for detecting a touch are arranged, or by making infrared light run vertically and horizontally on the surface of the tabletop 11 in order to detect a position where the light is interrupted.

Although the leg portions 12a to 12d are an example in the case of adopting four legs, the number of the lea portions is not limited thereto.

The projection unit 13 is formed by a box of a quadrangular prism of which top facing the tabletop 11 is open, and is provided with mirrors 13a and 13b inside thereof. Here, the mirrors 13a and 13b are fixed at angles as shown in the figure, and attached to a side surface of the box of the projection unit 13.

The casters 14a to 14d are attached to a bottom surface of the projection unit 13 so as to move the projection unit 13 in response to movement of the table including the tabletop 11, the leg potions 12a to 12d and the projector 15. In addition, a relative position of the projection unit 13 to the table should not be displaced. Here, although the casters are four in this case, the number of casters is not limited thereto.

The projector 15 is suspended from the back surface of the tabletop 11, fixed under the tabletop 11 and projects an image in the direction of the mirror 13a. The image is reflected by the mirror 13b and projected to the tabletop 11.

Although the table type display apparatus 10 is shown as an example here, in the present exemplary embodiment, not only the table type but also a display apparatus with any shape may be applied. Further, since the configuration of the display unit is not limited to the configuration in which an image is projected to the tabletop 11 from the projector 15 through the projection unit 13 described above, the display unit may be realized by using a flat panel display such as a liquid crystal display and a plasma display, a CRT display or other various display apparatuses.

<A Configuration of a Display Screen>

Next, a description will be given to an example of a configuration of a display screen of the table type display apparatus 10.

Figure 2:
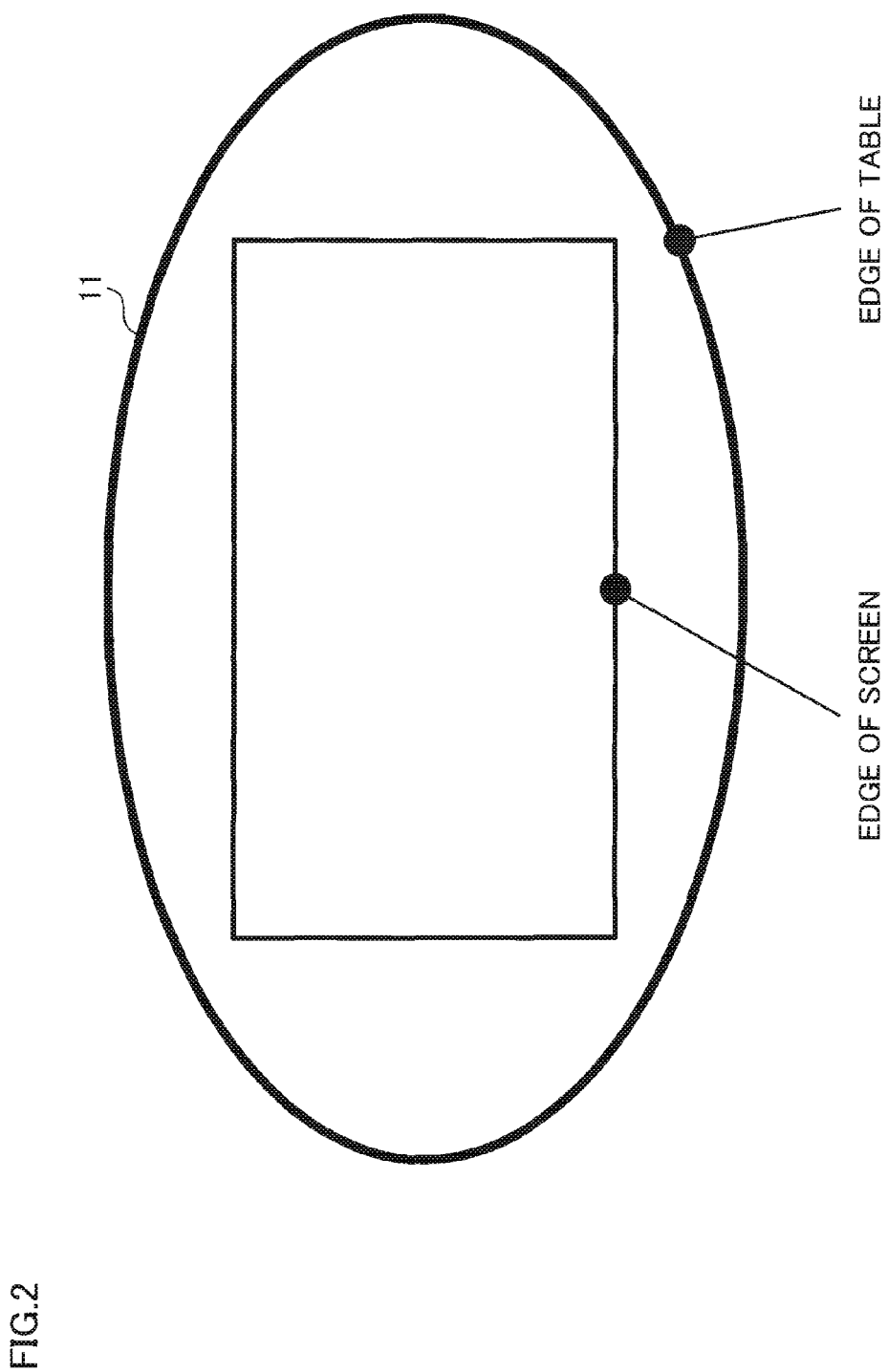
FIG. 2 is a view in which the table type display apparatus is seen from the top.

FIG. 2 is a view in which the table type display apparatus 10 is seen from the cop.

In the figure, an edge of the table (outline of the tabletop 11) is represented by a bold solid line. Here, although the shape of the table is oval, the shape does not have to be oval and may be accepted to be, for example, round or rectangle.

Further, a screen is provided inside of the tabletop 11 here. In the figure, an edge of the screen is represented by a thin solid line. Since an image that represents an electronic document (hereinafter, simply referred to as "electronic document"sometimes) is displayed on the screen, an area within the screen is a "display area." Here, although the shape of the screen is rectangular in this case, the shape does not have to be rectangular. For example, the shape may be oval along the shape of the table, or any other shapes.

In the present specification, electronic data serving as a source of an image recorded on a memory medium such as paper is described as the "electronic document." However, the implication of the "electronic document" is not limited to computerized data of a "document" including texts. For example, the "electronic document" includes image data such as a picture, a photograph and a drawing (irrespective of raster data or vector data), data recorded by database management software or spreadsheet software, and other printable electronic data.

<A Functional Configuration of the Table Type Display Apparatus>

Next, a description will be given to a functional configuration of the arithmetic unit of the table type display apparatus 10 according to the present exemplary embodiment.

Figure 3:
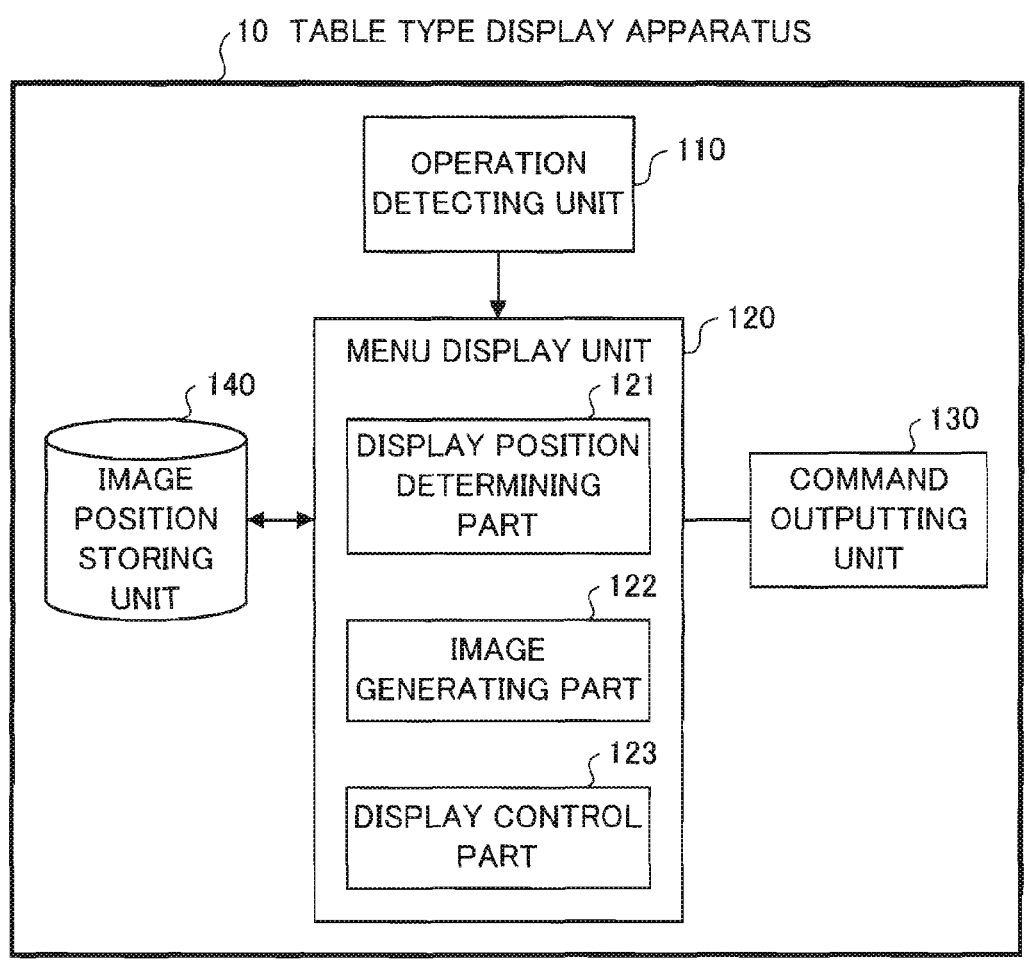
FIG. 3 is a block diagram illustrating an example of the functional configuration of the arithmetic unit according to the present exemplary embodiment.

FIG. 3 is a block diagram illustrating an example of the functional configuration of the arithmetic unit according to the present exemplary embodiment.

As shown in the figure, the table type display apparatus 10 is provided with an operation detecting unit 110, a menu display unit 120, a command outputting unit 130, and an image position storing unit 140. The operation detecting unit 110 detects a user operation on the screen. The menu display unit 120 displays a menu on the basis of the user operation on the screen. The command outputting unit 130 outputs a command in response to operation of a menu by the user on the screen. The image position storing unit 140 stores information on a position of an object image displayed on the screen. Here, the object image indicates images of various objects displayed on the screen, and mainly corresponds to the electronic document.

The operation detecting unit 110 detects the user operation by receiving a signal outputted by the touch panel which detects a touch with a finger to the touch panel provided on the tabletop 11 (refer to FIG. 1). That is, in the present exemplary embodiment, the operation detecting unit 110 that detects operation is provided as an example. Here, signals related to a touch with a finger include a signal indicating that a finger touches the touch panel (touch ON signal), a signal indicating that the finger moves away from the touch panel (touch OFF signal), and a signal indicating that the finger moves (is dragged) on the touch panel while the finger touches the touch panel (drag signal). Among the signals, the touch ON signal and the touch OFF signal transmit a position which the finger touches and a position which the finger moves away from, respectively. The drag signal transmits a position of a route on which the finger moves during the period from the transmission of the touch ON signal to the transmission of the touch OFF signal at an extremely short interval of time.

The menu display unit 120 receives a content of the user operation detected by the operation detecting unit 110, and performs processes such as displaying, changing and deleting the menu image in response to the content of the operation. In the present exemplary embodiment, the menu is selection items displayed on the d splay screen of the table type display apparatus 10. Each selection item is represented by a text or an icon image representing a content of the item. A user makes application software execute a desired process by selecting an item displayed in the menu.

As shown in FIG. 3, the menu display unit 120 according to the present exemplary embodiment is provided with a display position determining part 121 that calculates a display position of the menu image, an image generating part 122 that generates and outputs the menu image, and a display control part 123 that controls the display of the menu image as described later.

The display position determining part 121 determines the display position of the menu image on the screen in response to the operation for displaying the menu by a user. That is, in the present exemplary embodiment, the display position determining part 121 is provided as an example of a determination unit for determining the display position of the menu image. A detailed description will be later given to a determination method of the display position of the menu image by the display position determining part 121. The menu image may be fixedly displayed at a specified position on the screen (for example, at the center of the screen, at several positions around the edge of the screen or the like), and in such a case, the display position determining part 121 is not necessary.

The image generating part 122 generates the menu image of the present exemplary embodiment. That is, in the present exemplary embodiment, the image generating part 122 is provided as an example of a generating unit that generates the menu image. In the present exemplary embodiment, a user standing around the table type display apparatus 10 refers to or operates the screen provided on the tabletop 11 of the table type display apparatus 10. Therefore, in order to make easier the operation from various directions around the screen, in the present exemplary embodiment, the menu image in which the selection items are arranged geometrically in a circular or polygonal pattern within a certain area is generated. The menu image in which the selection items are arranged at positions of the same distance from a specified point may be considered as the one that allows the same operability from any directions around the screen. Specifically, for example, the menu image may be the one in which the selection items are arranged on the circumference of the circular pattern with the specified point as a center. A description will be later given to a specific aspect of the menu image of the present exemplary embodiment.

The display control part 123 controls the display of the menu image on the screen. That is, in the present exemplary embodiment, the display control part 123 is provided as an example of a controller that controls the display of the menu image. Specifically, the display control part 123 controls the display position determining part 121 and the image generating part 122 to make the menu image generated in response to the user operation detected by the operation detecting unit 110. Then the display control part 123 sends the generated menu image to the projector 15 (refer to FIG. 1), and makes the menu image displayed on the screen of the table type display apparatus 10. A content of the display control of the menu image by the display control part 123 includes at least display, change and deletion of the menu image.

In the display of the menu image, a control is performed for displaying the menu image generated by the image generating part 122 on the screen. When a signal outputted from the operation detecting unit 110 is the touch ON signal in a free area on the screen (an area where an object image is not displayed), the display control part 123 makes the menu image displayed at a display position of the menu image determined by the display position determining part 121.

Although a detailed description will be later given, when the menu has a hierarchical structure, the menu image is generated for each layer of the hierarchy. In this case, when the touch ON signal in a free area on the screen is detected, the display control part 123 makes the menu image of the first layer of the hierarchy displayed. When the signal outputted from the operation detecting unit 110 is the touch ON signal to a selection item of the menu image and the selection item has selection items of the lower layer, the display control part 123 makes the menu image of the next higher layer just below the layer including the selection item displayed.

In the change of the menu image, controls are performed for switching between active display and inactive display of the selection items, and rotating the menu image.

First of all, a description will be given to the control for switching between the active display and the inactive display of the selection items. In the menu having the hierarchy, as mentioned above, when the item having the lower layer is selected, the menu image of the lower layer than the layer including the item is displayed. Here, the selection items of the menu image that is newly displayed become selectable (active), and the selection items of the higher layer become non-selectable (inactive). Therefore, according to the layer display of the menus, with regard to the inactive selection items (layers), inactiveness thereof is represented by displaying the items being dimmed or monochrome. The display control part 123 controls switching between the active display and the inactive display of the selection items of each layer of the menu image displayed on the screen.

Next, a description will be given to the control for rotating the menu image.

As mentioned above, in the present exemplary embodiment, it is assumed that the menu operation is performed from various directions around the display screen of the table type display apparatus 10. By making the menu image in which the selection items are arranged in a circular pattern, usability is not largely changed if the operation is performed from any directions of the display screen. However, focusing on individual selection item, it may be considered that in comparison to the selection items located on the front side (on the user sided from the center, it is more difficult to operate the selection items located on the opposite side of the user to the center at the time of displaying the menu image on the screen, since the selection items are far from the user. Therefore, the display control part 123 makes positions of the selection items arranged in a circular pattern in the menu image dynamically changed (namely, rotates the selection items around the center) and hence controls the display in such a manner that every selection item comes to the front side for a certain interval of time. A description will be later given to a specific method of rotation control.

In the deletion of the menu image, a control is performed for deleting the menu image displayed on the screen. When the signal outputted from the operation detecting unit 110 is the touch ON signal, for example, at a specified point of the menu image (the center in the case where the selection items are arranged in a circular pattern as mentioned above or the like), the display control part 123 deletes the menu image associated with the specified point.

The command outputting unit 130 receives the content of the user operation detected by the operation detecting unit 110 and also receives position information and control information of the menu image by the menu display unit 120. Further, the command outputting unit 130 determines whether or not the content of the user operation is a touch operation (menu operation) to the selection items of the menu image. When the content of the user operation is the menu operation, the command outputting unit 130 outputs a command for executing various actions in accordance with the content of the operation.

Specifically, for example, when the touch operation is performed to the selection item associated with a specified function executed by an application, the command outputting unit 130 outputs a command for starting the application or making the application execute a process. Further, when the touch operation is performed to a selection item having a lower layer, the command outputting unit 130 outputs a command for making the display control part 123 of the menu display unit 120 display the menu image of the lower layer associated with the selection item.

The image position storing unit 140 stores the information specifying the position of an object image displayed on the screen. At that time, the image position storing unit 140 may store appendant information including information whether the object image such as an electronic document remains the original image, the object image is thumbnailed, or the object image is hidden behind the edge of the screen.

Here, a description will be given to coordinates set on the screen of the table type display apparatus 10.

Figure 4:
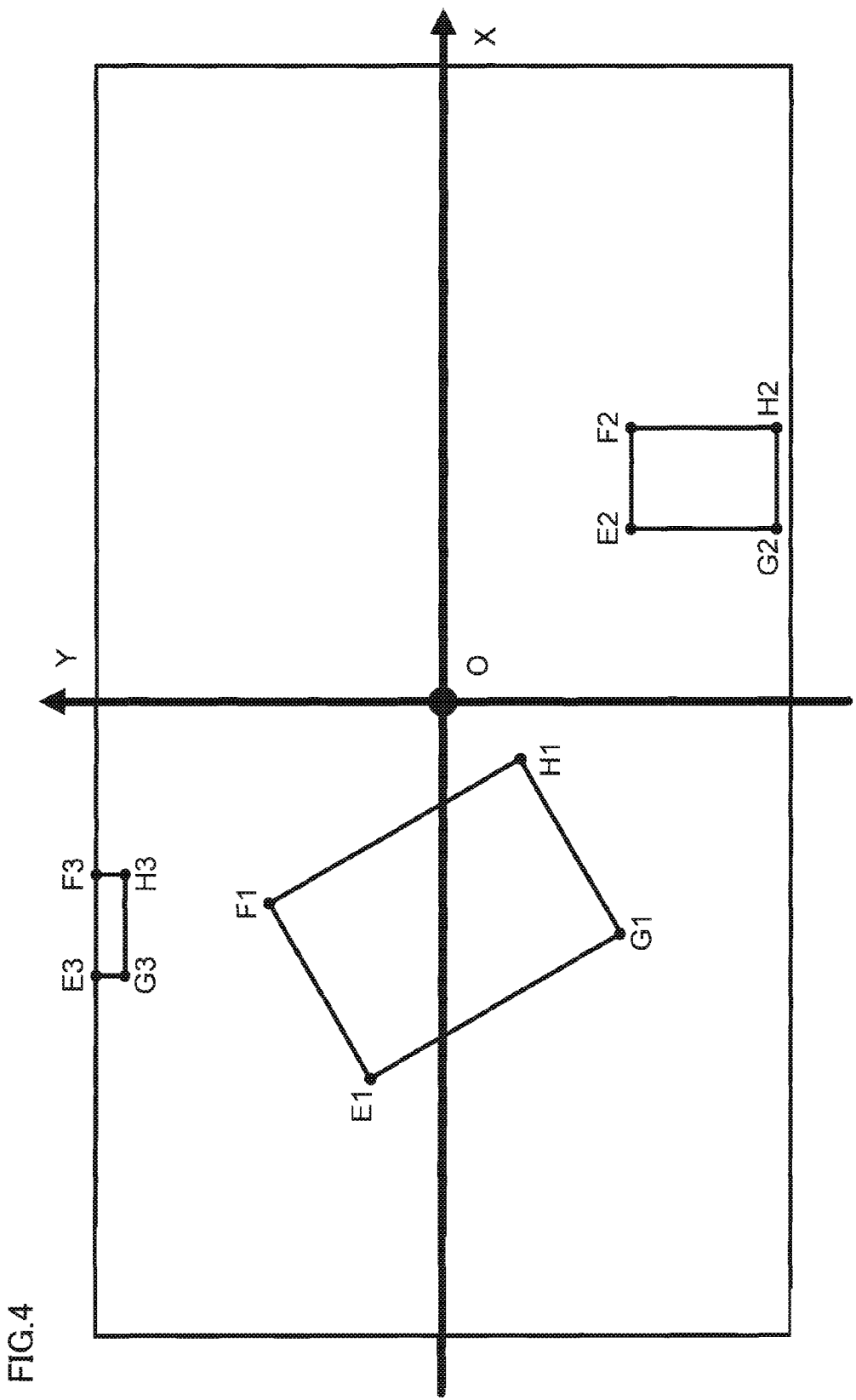
FIG. 4 is a diagram illustrating an example of the coordinates to be set on the screen.

FIG. 4 is a diagram illustrating an example of the coordinates to be set on the screen. In the example of the figure, the screen is a rectangle and the center is the origin. An X axis is in the longitudinal direction of the rectangle and a Y axis is in the direction orthogonal to the longitudinal direction. On the screen in the figure, plural electronic documents are displayed as object images. Further, the electronic documents are shown as a tetragon having vertexes E1, F1, G1 and H1 (the electronic document 1) and a tetragon having vertexes E2, F2, G2 and H2 (the electronic document 2) Furthermore, another electronic document of which part is hidden behind the edge of the screen is shown as a tetragon having vertexes E3, F3, G3 and H3 (the electronic document 3).

FIG. 5 is a diagram illustrating a specific example of information stored in the image position storing unit 140 in the case where the electronic documents (object images) are displayed as shown in FIG. 4.

Since the images of the electronic documents are displayed in any direction on the screen, the image position storing unit 140 stores coordinates of three points including a left top point, a right top point and a left bottom point. In the figure, an image ID "Q001" represents the electronic document 1 in FIG. 4, an image ID "Q002" represents the electronic document 2 entirely shown in FIG. 4, and an image ID "Q003" represents the electronic document 3 partly shown in FIG. 4. With regard to a display state of the electronic documents 1 to 3 the state whether the documents are entirely shown or partly shown is represented by the content of the flags. That is, a flag "0" shows the electronic documents (1, 2) in a state where the documents are entirely shown, and a flag "1" shows the electronic document (3) in a state where the documents are partly shown. The image position storing unit 140 also stores document IDs of the original electronic documents for each of the images.

<An Aspect of a Menu Display>

First of all a description will be given to a determination method of a display position of the menu image by the display position determining part 121.

In the present exemplary embodiment, an image in which the selection items are arranged in a circular pattern around the center is used as the menu image. The display position of the menu image is represented by a coordinate value of the center on the coordinates to be set on the screen. Most basically, a method for determining the display position of the menu image by taking a position on the screen where a user touches with a finger as a position of the center is considered However, the menu image is displayed as area in a certain range where the selection items are arranged in a circular pattern around the center. Consequently, when the object image such as the electronic document is displayed in the vicinity of the position where the user touches, it is considered that the object image is overlapped by the menu image. Therefore, in such a case, in order to avoid overlapping of the object image and the menu image, the menu image may be displayed by setting the center to a position displaced from the position actually touched on the screen.

For example, the following method is considered as a specific method for displaying the menu image in order to avoid overlapping with the object image.

First of all, the display position determining part 121 acquires position information of the object image from the image position storing unit 140. Then, the display position determining part 121 determines whether or not there is an object image within a range from the position touched on the screen (the touch position) to distance corresponding to radius of a circle of the menu image. When there is an object image within the range, the display position determining part 121 calculates a coordinate value of an object image that is the nearest to the touch position. Further, the display position determining part 121 determines the position of the center in such a manner that distance from the position where the coordinate value is calculated to the position of the center is set to be equal to or more than the radius of the circle of the menu image on a line joining the position where the coordinate value is calculated and the touch position.

Figure 6A:
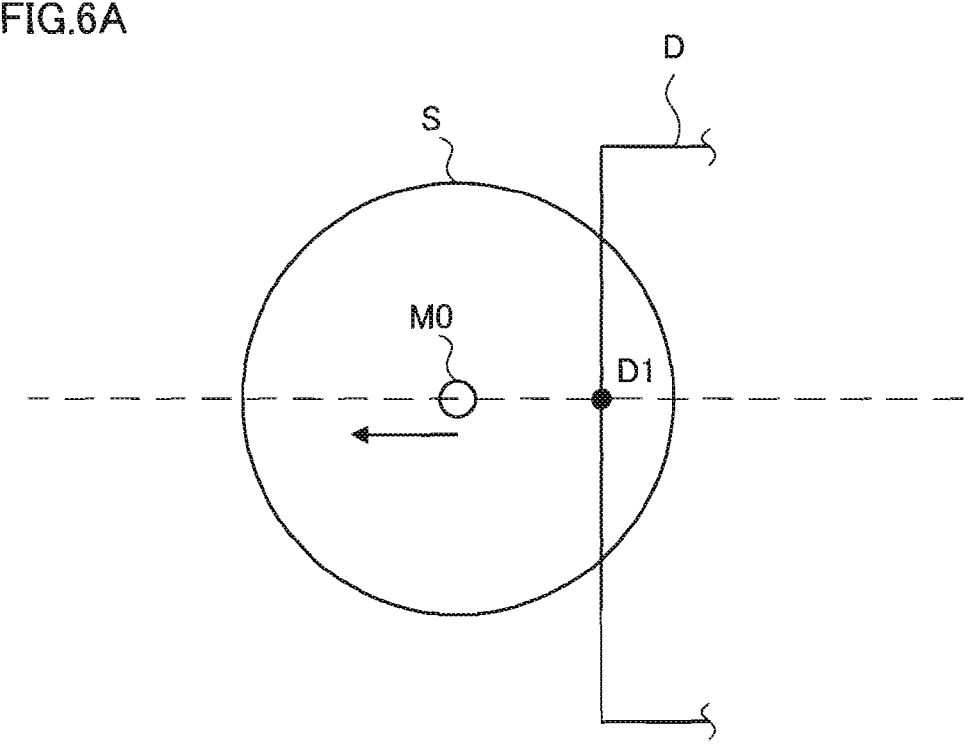
FIGS. 6A and 6B are diagrams illustrating that the position of the center is moved to avoid the overlapping of the menu image and the object image.
Figure 6B:
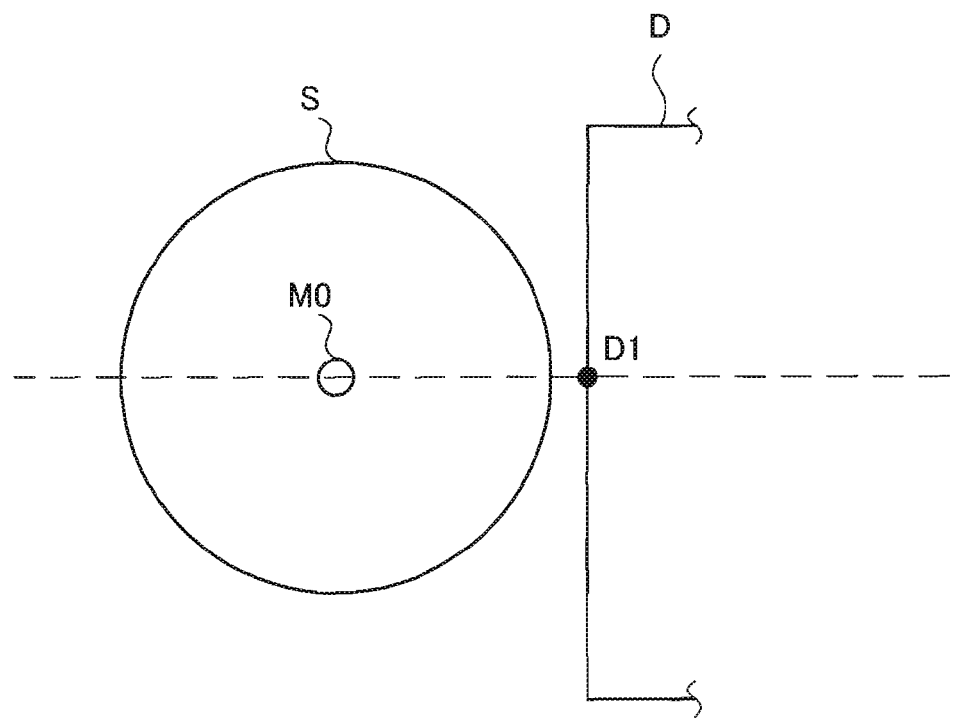

FIGS. 6A and 6B are diagrams illustrating that the position of the center is moved to avoid the overlapping of the menu image and the object image. FIG. 6A shows a state in which the object image is overlapped with the menu image, and FIG. 6B shows a state in which the center is moved. In FIGS. 6A and 6B, a circle S having a center M0 is a range of the menu image.

According to FIG. 6A, an object image D and the circle S have an overlapped portion. When the menu image is displayed in such a state, the object image D is overlapped with the menu image. Therefore, as shown in FIG. 6B, along a line coining the center M0 and a point D1 that is the nearest to the center M0 within the object image D (a line shown by a broken line in the figure), the center M0 is moved until the point D1 is located outside of the circle S.

When plural object images are overlapped with the menu image, the operation mentioned above may be repeated to each of the object images in order to determine the center.

However, when plural object images are displayed on the screen, there may be a case where any of the object images is overlapped with the menu image even if the center is moved. In such a case, some methods for determining the center are considered such as a method in which the number of the object images overlapped with the menu image becomes minimum, a method in which the distance from the center to the object image that is the nearest to the center becomes the longest, or the like. In the case, the process for displacing the menu image as mentioned above may not be performed.

Although multilayered menu images may be displayed as described later, it may not be predictable how far the displayed layer finally goes down at a stage when the display position of the menu image is initially determined. Therefore, a display position is determined on the basis of relation with other object images only for the menu image of the highest layer. In the case where the object image is overlapped with the menu image when the menu image of the lower layer is displayed, the menu image is displayed while overlapping the object image.

Next, a description will be given to a configuration of the menu image.

Figure 7:
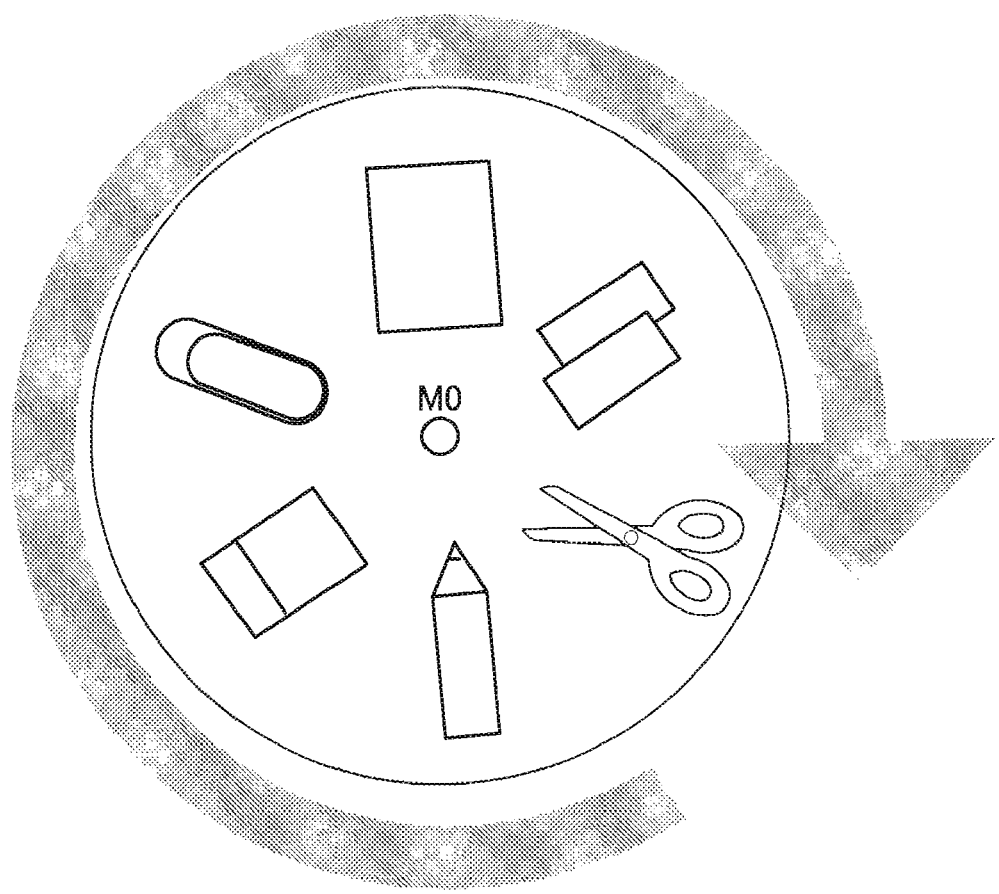
FIG. 7 is a diagram illustrating an example of a configuration of the menu image according to the present exemplary embodiment.

FIG. 7 is a diagram illustrating an example of a configuration of the menu image according to the present exemplary embodiment.

As shown in FIG. 7, the menu image is the one in which the selection items are arranged on the circumference having the center M0. In the example of the figure, six icons are displayed for showing contents of processes as the selection items. The configuration of the menu image only requires the arrangement of the selection items on the circumference having the center M0, but not limited to the configuration shown in FIG. 7. That is, the number of the selection items is not limited to six. Further, not the icons but texts (digital fonts, designs of characters or the like) for showing the contents of the processes may be displayed for the selection items. Furthermore, combination of the icons and the texts may be displayed.

Figure 8B:
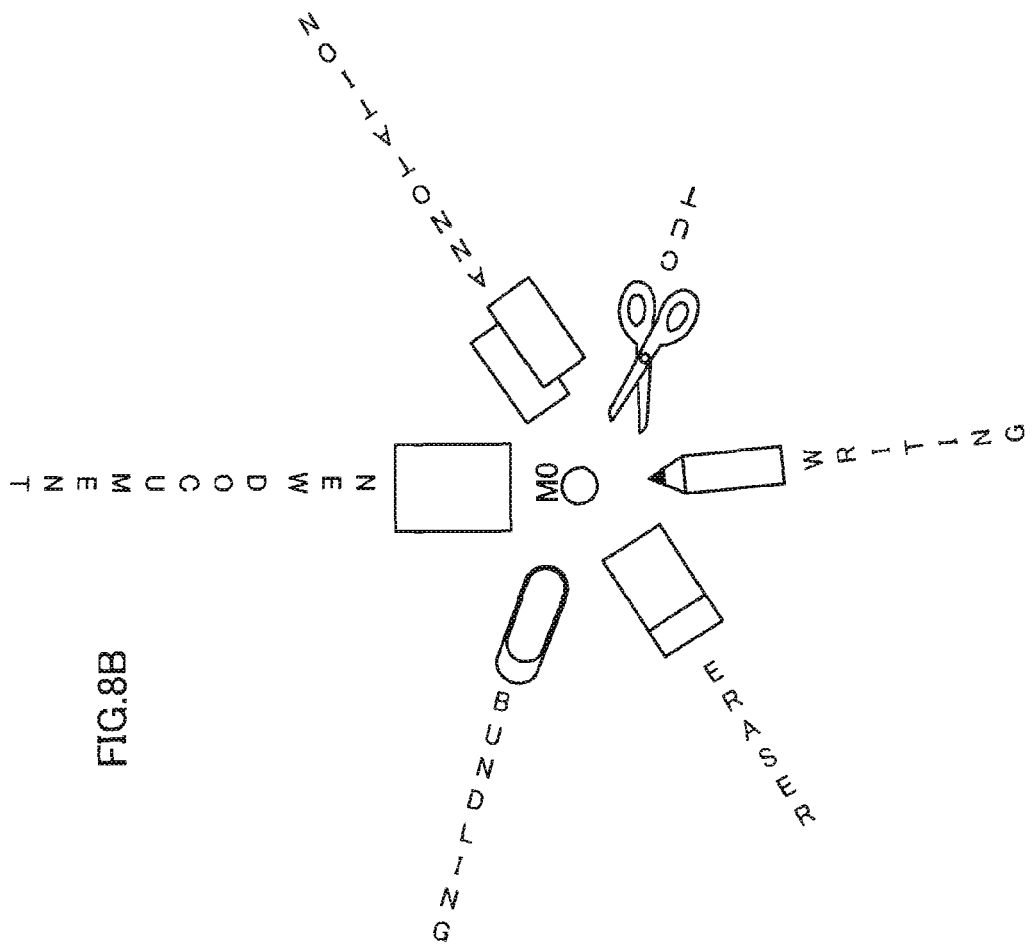
FIG. 8B is a diagram illustrating another example of the menu image in which the icons and the texts are combined.
Figure 8A:
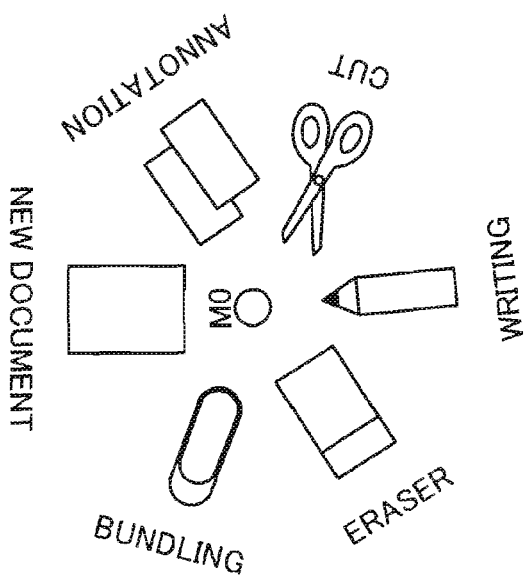
FIG. 8A is a diagram illustrating an example of the menu image in which the icons and the texts are combined.
Figure 9:
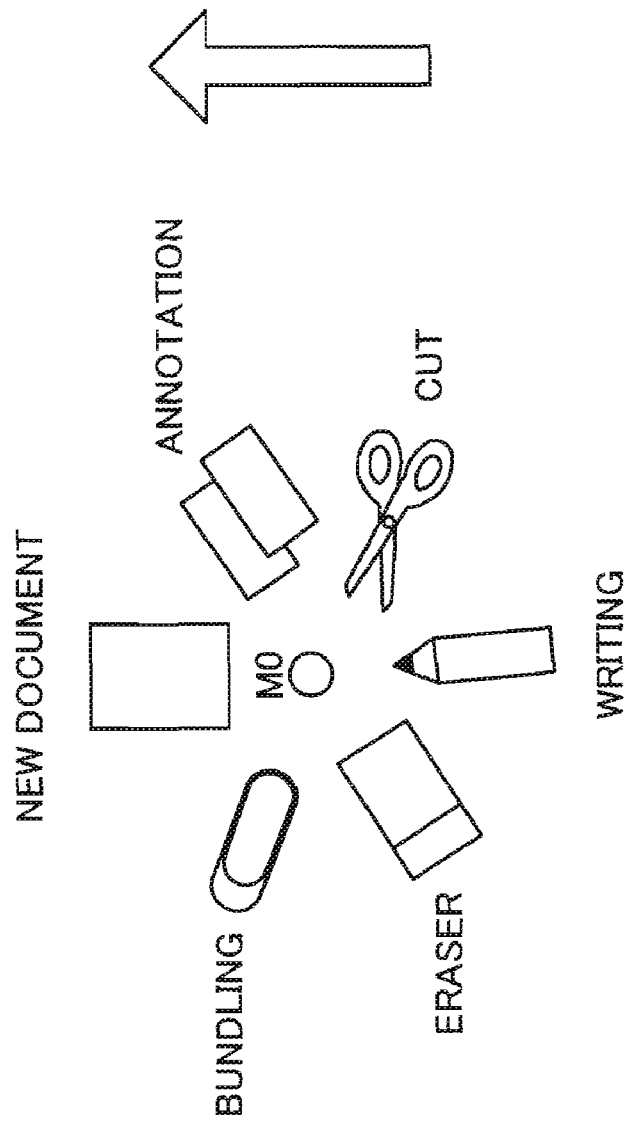
FIG. 9 is a diagram illustrating further example of the menu image in which the icons and the texts are combined.

FIGS. 8A, 8B and 9 are diagrams illustrating examples of the menu image in which the icons and the texts are combined. In the example shown in FIG. 8A, texts are horizontally written outside of icons with the direction of the center M0 up. In the example shown in FIG. 8B, texts are vertically written outside of icons with the direction of the center M0 up. In the example shown in FIG. 9, texts are horizontally written outside of icons with a certain direction (the arrow direction in the figure) up.

In order to display the texts with a certain direction up, it is necessary to identify a position to the screen where a user stands. To realize it specifically, the following is considered. A transmitter and receivers for performing wireless communication of ID are prepared, the receivers are arranged at a predetermined interval around the screen, and a calculator that determines which receiver receives ID from the transmitter is provided in the table type display apparatus 10. A user holds the transmitter and controls the direction of text display, for example, with a position of the receiver that receives ID down and with the center of the screen up.

In the menu image shown in FIGS. 7 to 9, the icons and the texts are button objects. Therefore, when a user touches a desired icon (or a text) from the menu image displayed on the screen with a finger and the item is selected, a process associated with the icon (or the text) is executed.

There is a case where the selection items of the menu are set hierarchically. In this case, when the selected item has the selection items of the next higher layer associated with the selected item, the selection items of the layer (the layer just below the layer including the selected item) are displayed. Hereinafter, a description will be given to an example of a display method of the multilayered menus according to the present exemplary embodiment.

Figure 10A:
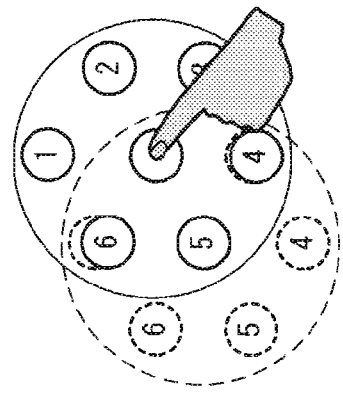
FIGS. 10A, 10B and 10C are diagrams illustrating a first display method of the multilayered menus.
Figure 10B:
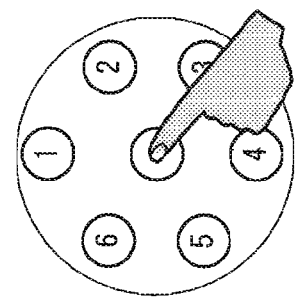
Figure 10C:
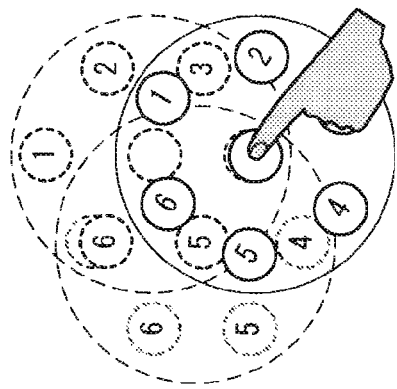

FIGS. 10A, 10B and 10C are diagrams illustrating a first display method of the multilayered menus.

In the display method, when a predetermined item of the menu is selected and there are selection items of the lower layer than that including the selected item, the menu in which the selection items of the lower layer are arranged in a circular pattern with the selected item as a new center is displayed. When the selection items of the lower layer are displayed, the selection items of the higher layer are displayed by being dim or monochrome so as to indicate that the selection items of the higher layer are currently not selectable. In FIGS. 10A, 10B and 10C, individual selection item is symbolized by a circle.

FIG. 10A shows a state in which the menu of a first layer (the highest layer) is displayed. The selection items are arranged in a circular pattern with the position touched with the finger as the center. FIG. 10B shows a state in which a selection item 2 is selected from the menu of the first layer, and the selection items of a second layer (the next higher layer associated with the selection item 2 of the first layer) are displayed as the menu. The selection items of the second layer are arranged in a circular pattern with the position of the selection item 2 of the first layer as a new center. FIG. 10C shows a state in which a selection item 4 is selected from the menu of the second layer, and the selection items of a third layer (the next higher layer associated with the selection item 4 of the second layer) are displayed as the menu. The selection items of the third layer are arranged in a circular pattern with the position of the selection item 4 of the second layer as a new center.

FIGS. 11A, 11B, 11C and 11D are diagrams illustrating a second display method of the multilayered menus.

In the display method, when a predetermined item of the menu is selected and there are selection items of the lower layer than that including the selected item, the menu in which the selection items of the lower layer are linearly arranged with the selected item as a base point is displayed. When the selection items of the lower layer are displayed, the selection items of the higher layer are displayed by being dim or monochrome so as to indicate that the selection items of the higher layer are currently not selectable. In FIGS. 11A, 11B, 11C and 11D, individual selection item is symbolized by a circle.

Figure 11B:
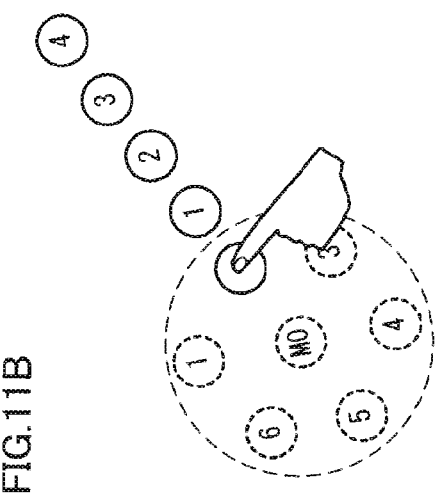
FIGS. 11A, 11B, 11C and 11D are diagrams illustrating a second display method of the multilayered menus.
Figure 11D:
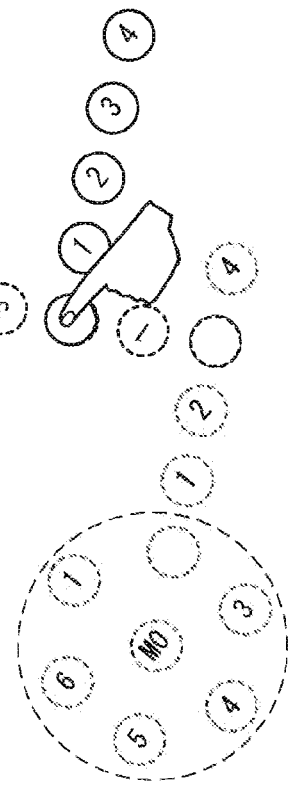
Figure 11A:
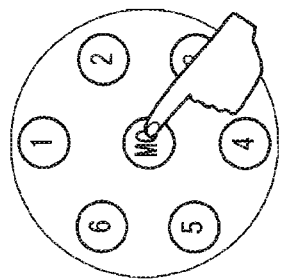
Figure 11C:
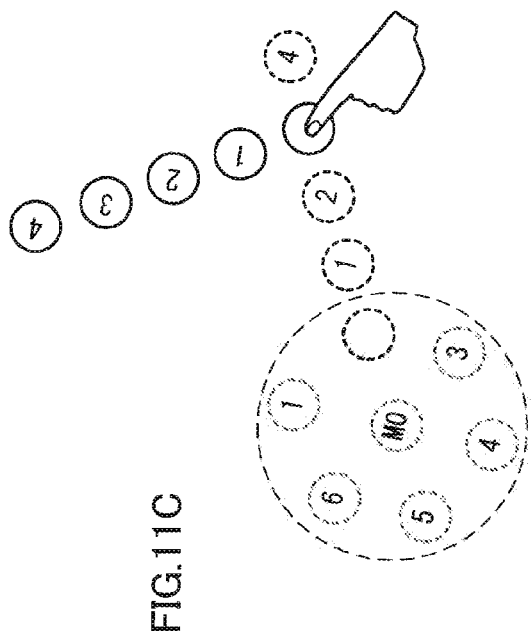

FIG. 11A shows a state in which the menu of the first layer is displayed as well as FIG. 10A. FIG. 11B shows a state in which the selection item 2 is selected from the menu of the first layer and the selection items of the second layer are displayed as the menu. The selection items of the second layer are linearly arranged along the direction from the center of the menu of the first layer to the selection item 2 (namely, towards the outside of the circle) with the selection item 2 of the first layer as a base point. FIG. 11C shows a state in which a selection item 3 is selected from the menu of the second layer and the selection items of the third layer are displayed as the menu. With the selection item 3 of the second layer as a base point, the selection items of the third layer are linearly arranged along the direction orthogonal to the extending direction of the menu of the second layer (the direction from the base point to an end) FIG. 11D shows a state in which the selection item 2 is selected from the menu of the third layer and the selection items of a fourth layer (the next higher layer associated with the selection item 2 of the third layer) are displayed as the menu. The selection items of the fourth layer are linearly arranged along the direction orthogonal to the extending direction of the menu of the third layer with the selection item 2 of the third layer as a base point.

The menu of the third layer shown in FIG. 11C extends leftwards to the extending direction of the menu of the second layer. The menu of the fourth layer extends rightwards to the extending direction of the menu of the third layer. The extending directions of the menu of the layers are not limited to the examples in the figures. However, since the menus alternately extend leftwards and rightwards as shown in the examples of the figures, the menu extends in the direction gradually moving away from the center of the first layer as a whole. Therefore, it may be considered that the state in which the layer goes down to a distant (deep) layer is easy to figure out intuitively.

The first display method and the second display method mentioned above may be combined for use.

FIGS. 12A, 12B, 12C and 12D are diagrams illustrating situations in which the first display method and the second display method are alternately used.

Figure 12A:
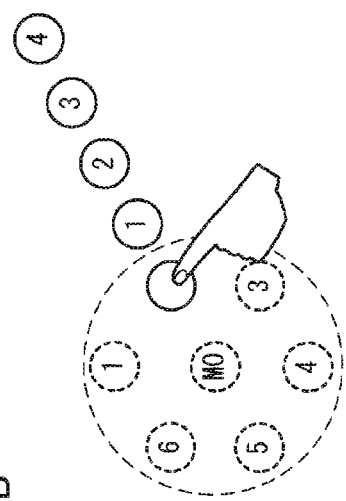
FIGS. 12A, 12B, 12C and 12D are diagrams illustrating situations in which the first display method and the second display method are alternately used.
Figure 12B:
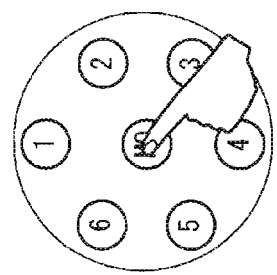
Figure 12C:
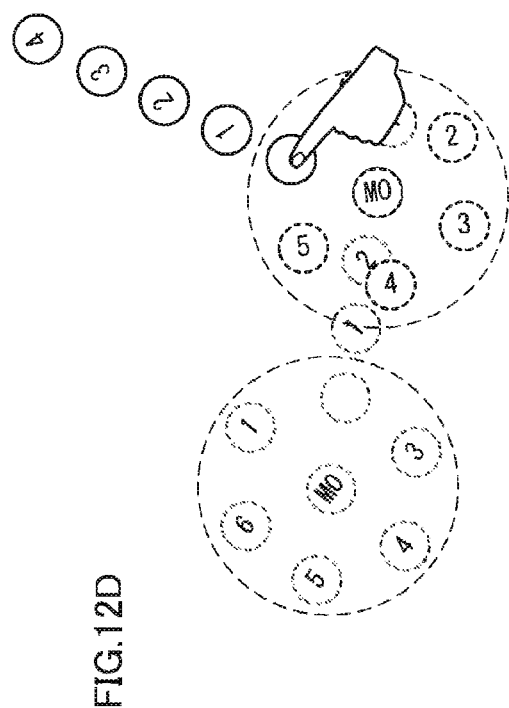
Figure 12D:
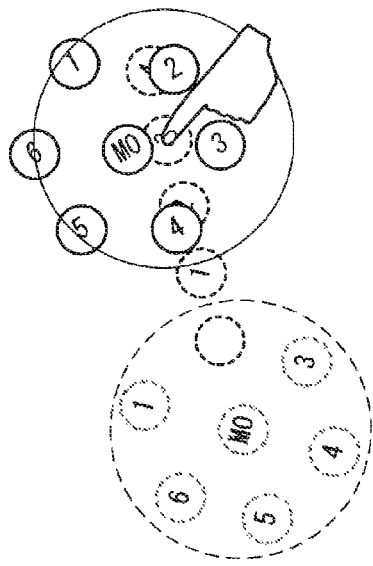

FIG. 12A shows a state in which the menu of the first layer is displayed similar to FIG. 10A. FIG. 12B shows a state in which the selection item 2 is selected from the menu of the first layer and the selection items of the second layer are displayed as the menu. Similar to the second display method shown in FIG. 11B, the selection items of the second layer are linearly arranged along the direction from the center of the menu of the first layer to the selection item 2 with the selection item 2 of the first layer as a base point. FIG. 12C shows a state in which the selection item 3 is selected from the menu of the second layer and the selection items of the third layer are displayed as the menu. The selection items of the third layer are arranged in a circular pattern with the position of the selection item 3 of the second layer as a new center. FIG. 12D shows a state in which the selection item 6 is selected from the menu of the third layer and the selection items of the fourth layer are displayed as the menu. The selection items of the fourth layer are linearly arranged along the direction from the center of the menu of the third layer to the selection item 6.

FIGS. 13A, 13B, 13C and 13D are diagrams illustrating a third display method of the multilayered menus.

In the display method, when a predetermined item of the menu is selected and there are selection items of the lower layer than that including the selected item, the menu in which the selection items of the lower layer are arranged in a circular pattern outside of the displayed menu image is displayed. When the selection items of the lower layer are displayed, the selection items of the higher layer are displayed by being dim or monochrome so as to indicate that the selection items of the higher layer are currently not selectable. In FIGS. 13A, 13B, 13C and 13D, individual selection item is symbolized by a circle.

Figure 13B:
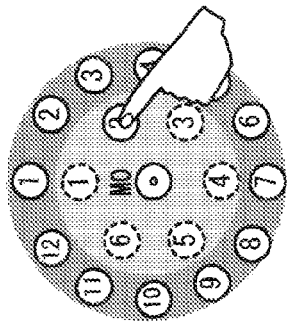
FIGS. 13A, 13B, 13C and 13D are diagrams illustrating a third display method of the multilayered menus.
Figure 13D:
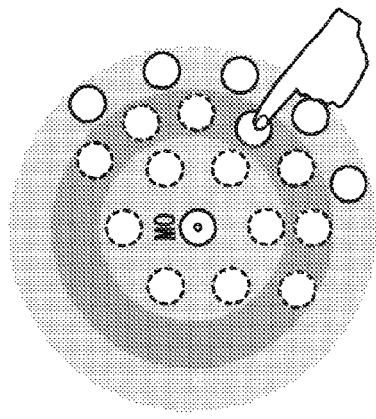
Figure 13A:
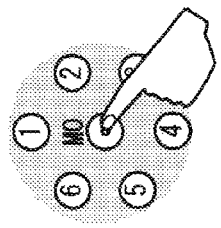
Figure 13C:
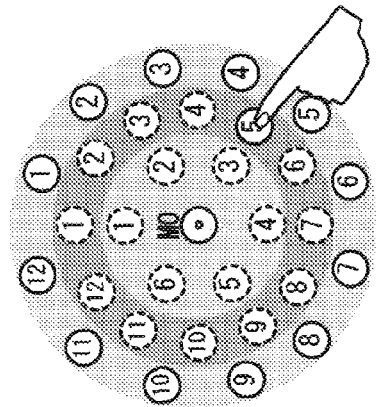

FIG. 13A shows a state in which the menu of the first layer is displayed similar to FIG. 10A. FIG. 13B shows a state in which the selection item 2 is selected from the menu of the first layer and the selection items of the second layer are displayed as the menu. The selection items of the second layer are arranged on the circumference outside of the menu image of the first layer. FIG. 13C shows a state in which a selection item 5 is selected from the menu of the second layer and the selection items of the third layer are displayed as the menu. The selection items of the third layer are arranged on the circumference further outside of the menu image of the second layer. The selection items of each layer are arranged on the circumference at an equal interval. Alternatively, as shown in FIG. 13D, the selection items may be disproportionately arranged in the vicinity of the selected item of the layer that is one layer higher.

In the present exemplary embodiment the menu image of each layer may be generated as an integrated image for each layer, or generated as a combined image by combining Images for each of the selection items that is individually generated in each layer. Choice of the image generation method above depends on the rotation control method of the menu image by the display control part 123 described later. Therefore, a description will be given to both the choice of the image generation method and the rotation control method.

Next, a description will be given to the rotation control method of the menu image.

As mentioned above, with regard to the menu image in which the selection items are arranged in a circular pattern, in comparison to the selection items located on the front side (on the user side) from the center, it is more difficult to operate the selection items located on the opposite side of the user to the center since the selection items are more distant. Particularly, when displaying a hierarchy, even if any display method shown in FIGS. 10 to 13 is used, it is difficult to operate the selection items since the menu image of the lower layers of the selection items located on the opposite side of the user to the center is displayed in the direction moving away from the user. Therefore, the positions of the selection items arranged in a circular pattern are rotated and moved around the center so that every selection item comes to the front side at a certain interval of time.

In the case of displaying the multilayered menus, if the higher layer is rotated while displaying the lower layer, the position of the menu image of the lower (deeper layer is more largely moved, and hence it is considered that there is a problem of the operability. Therefore, when the lower layer is displayed, the rotation of the menu image of the higher layer than the layer that is displayed at the last is stopped.

The rotation control is performed only for the menu image in which the selection items are arranged in a circular pattern such as the menu image of the first layer, and the menu image of each layer by the display method shown in FIGS. 10A, 10B, 10C and 10D. The rotation control is not performed for the menu image in which the selection items are linearly arranged such as the menu image of the second layer or lower by the display method shown in FIGS. 11A, 11B, 11C and 11D.

As a method for rotating the menu image displayed on the screen, in the present exemplary embodiment, a description will be given to a method for rotating the menu image itself, and a method for dynamically changing the positions of each items (icons or the like) included in the menu image. In the former, since the entire menu image is regarded as one image, the menu image of each layer is generated as an integrated image for each layer. In the latter, since the display position is controlled for each of the selection items, the menu image is generated by combining the images for each of the selection items that is individually generated in each layer.

First of all, a description will be given to the method for rotating the menu image itself.

In this case, the menu image is generated as a video file for each layer. For example, by using software such as "Flash" of Adobe Systems Incorporated in the United States, the menu image may be generated as a video file where each of the selection items (icons or the like) arranged in a circular pattern has a button function separately. In this case, for example, the video file of the menu image is generated by the image generating part 122. The display control part 123 replays the video file generated by the image generating part 122 so as to realize the rotation control of the menu image.

Instead of generating the menu image as the video file still images of plural menu images in which the position of each selection item is slightly different each other are generated and the still images are sequentially switched and displayed so that an expression as if the menu image is rotated is realized. In this case, for example, the image generating part 122 generates the still images of plural menu images and the display control part 123 controls the switching of the display of each still images.

Next, a description will be given to the method for dynamically changing the positions of each selection item included in the menu image.

In this case, each selection item (an icon or the like) is independently generated and arrangement position thereof is specified in accordance with relative position to the center of the menu image. For example, it is considered that the menu image has six selection items and each of the selection items is arranged on the circumference of radius i at an equal interval with the center of the menu image as a center. In this case, if coordinates of the center on the screen are (x, y), the arrangement positions of six selection items are, for example, six points of:

$$(x, y+i),$$

$$\left(x+\frac{\sqrt{3}i}{2}, y+\frac{i}{2}\right),$$

$$\left(x+\frac{\sqrt{3}i}{2}, y-\frac{i}{2}\right),$$

$$(x, y-i),$$

$$\left(x-\frac{\sqrt{3}i}{2}, y-\frac{i}{2}\right), \text{ and}$$

$$\left(x-\frac{\sqrt{3}i}{2}, y+\frac{i}{2}\right).$$

Each of the selection items is arranged at these positions and the selection item displayed at each position is sequentially switched. In this way, each of selection items is displayed in such a manner that each of the selection items is sequentially moved on the arrangement positions. Therefore, although the movement is similar to frame-by-frame advance, an expression as if each of the selection items is rotated (moved) around the center is realized.

In addition to the six points described above, other six points of:

$$\left(x+\frac{i}{2}, y+\frac{\sqrt{3}i}{2}\right),$$

$$(x+i, y),$$

$$\left(x+\frac{i}{2}, y-\frac{\sqrt{3}i}{2}\right),$$

$$\left(x-\frac{i}{2}, y-\frac{\sqrt{3}i}{2}\right),$$

$$(x-i, y), \text{ and}$$

$$\left(x-\frac{i}{2}, y+\frac{\sqrt{3}i}{2}\right),$$

are defined as the arrangement positions of the selection items. While switching between a set of the initial six points and a set of the following six points, the selection item displayed at each position is sequentially switched. Therefore, a smoother rotation may be expressed.

When using the methods, for example, the image generating part 122 generates the images and the texts for each of the selection items and sets the arrangement positions for each of the selection items in accordance with the number of the selection items, and the display control part 123 controls the switching of the display of each of the selection items.

The methods for controlling the display of the menu image are only examples and the method is not limited to the above specific methods. In addition, when the texts are used for the display of the selection items, by the method for rotating the menu image itself, the texts themselves are also rotated. Therefore, when the texts are displayed in the menu image with a certain direction up as shown in FIG. 9, a method for dynamically changing the positions of each of the selection items included in the menu image is taken.

The rotation control of the menu image mentioned above may be performed by rotation with a certain rotational speed during the period, for example, from the display of the menu image on the screen by the display control of the menu image until the deletion of the menu image from the screen by the deletion control of the menu image. Further, the rotational speed may be changed so as to be gradually slower (or faster) than that at the beginning of the display. Furthermore, in response to the user operation to the menu image (for example, an operation of touching and dragging any of the selection items) the rotation control may be performed as if the menu image is manually rotated.

In the present exemplary embodiment, although a description is given as the user operation is detected by the touch panel which detects the touch with a finger to the touch panel provided on the tabletop 11, the user operation may be detected by the touch panel which detects touch with a specific device such as a pen device other than a finger. Further, not only the touch to the touch panel but also an operation with using other pointing devices such as a mouse may be received.

Finally, a description will be given to an example of a hardware configuration of a computer 90 that is for realizing the arithmetic unit in the table type display apparatus 10 according to the present exemplary embodiment.

Figure 14:
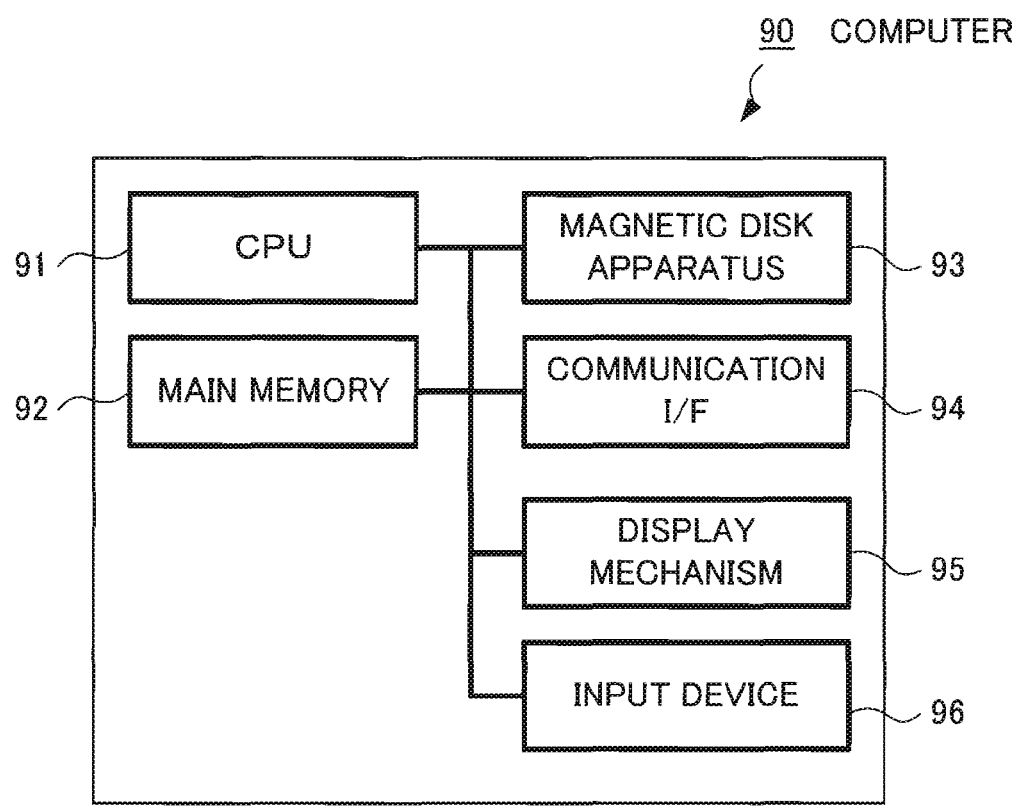
FIG. 14 is a diagram illustrating the hardware configuration of the computer.

FIG. 14 is a diagram illustrating the hardware configuration of the computer 90.

As shown in the figure, the computer 90 is provided with a CPU (Central Processing Unit) 91, and a main memory 92 and a magnetic disk apparatus (HDD: Hard Disk Drive) 93 that are storage devices. Here, the CPU 91 executes OS (Operating System) and various kinds of software such as applications and realizes various functions. The main memory 92 is a memory area that stores various kinds of software, data used for executing the software and the like. The magnetic disk apparatus 93 is a memory area that stores input data to various kinds of software, output data from various kinds of software and the like.

Further, the computer 90 is provided with a communication I/F 94 that performs communication with external devices, a display mechanism 95 including a video memory, a display and the like, and an input device 96 such as a keyboard, the mouse or the like.

When the arithmetic unit in the table type display apparatus 10 according to the present exemplary embodiment is realized by the computer 90 shown in FIG. 14, the operation detecting unit 110, the menu display unit 120 and the command outputting unit 130 as shown in FIG. 3 are realized by CPU 91 through executing a program (software) read from the magnetic disk apparatus 93 to the main memory 92. Further, the image position storing unit 140 is realized by the memory such as the main memory 92, the magnetic disk device 93 and the like. The program that realizes the present exemplary embodiment may be provided not only by a communication device but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
a generating unit that generates a menu image in which selection items of a menu are geometrically arranged;
a controller that makes the menu image be displayed on a screen of a display, and that makes positions of the selection items in the menu image dynamically changed,
a determination unit that recognizes a position of an object image displayed on the screen of the display, and that determines a display position of the menu image so as not to overlap the object image with the menu image, wherein
the controller makes the menu image displayed at the position determined by the determination unit,
the generating unit generates the menu image separately for each layer of the menu set in a hierarchy, and
the controller makes the menu image of a lower layer be displayed on the screen of the display when the selection item associated with the lower layer is selected among the selection items comprised in the displayed menu image, and makes the menu image of a higher layer from which the selection item was selected be displayed in a manner that indicates that selection items of the higher layer are not currently selectable, wherein
the selection items are arranged in a circular pattern,
the positions of the selection items arranged in the circular pattern are rotated and moved around a center of the circular pattern,
when the lower layer is displayed, a rotation of the menu image of the higher layer than the layer that is displayed at the last is stopped, and
when one of the circularly arranged selection items is selected, selection items of the lower layer are linearly arranged with the selected selection item as a base point.

2. The display apparatus according to claim 1, wherein the generating unit generates the menu image as a video file where the selection items are rotated and moved on a predetermined circumference, and the controller makes the video file of the menu image replayed on the screen of the display so as to make the positions of the selection items changed.

3. The display apparatus according to claim 1, wherein the generating unit generates a plurality of the menu images in which the selection items are arranged at different positions within a certain area, and
the controller makes the menu images be displayed on the screen of the display while switching the plurality of the menu images so as to make the positions of the selection items changed.

4. The display apparatus according to claim 1, wherein the generating unit generates the menu image on the basis of combination of images for each of the selection items that is individually generated, and
the controller sets arrangement positions of the selection items of which the number is the same or more as the number of the selection items, and sequentially switches the selection items to be displayed at each of the arrangement positions so as to make the positions of the selection items changed.

5. The display apparatus according to claim 1, wherein the controller makes a change speed of the positions of the selection items dynamically changed.

6. The display apparatus according to claim 1, wherein, when one of the linearly arranged selection items is selected, selection items of the further lower layer are arranged in a circular pattern with a position of the selected selection item as a new center.

7. The display apparatus according to claim 1, wherein
when a second selection is made from the selection items of the lower layer that are linearly arranged, a first menu of the selection extends linearly to one of a left direction and a right direction of the selection items of the lower layer that are linearly arranged,
when a third selection is made from the first menu that extends linearly, a second menu extends linearly to one of a left direction and a right direction of the first menu, and
the first menu and the second menu extend in the left and right directions alternately.

8. The display apparatus according to claim 1, wherein
the controller displays the menu image on the screen so that the positions of the selection items in the menu image are dynamically changed in front of a plurality of users that surround the display apparatus such that selection of the selection items can be made from different directions around the display screen, and
the controller positions the selection items arranged in the circular pattern dynamically, such that every selection item comes to a front side of each user for a certain interval of time.

9. A non-transitory computer readable medium storing a program causing a computer to execute a process for image processing, the process comprising:
generating a menu image in which selection items of a menu are geometrically arranged; and
making the menu image be displayed on a screen of a display, and making positions of the selection items in the menu image dynamically changed,
the process further comprising:
generating the menu image separately for each layer of the menu set in a hierarchy,
making the menu image of a lower layer be displayed on the screen of the display when the selection item associated with the lower layer is selected among the selection items comprised in the displayed menu image, and
makings the menu image of a higher layer from which the selection item was selected be displayed in a manner that indicates that selection items of the higher layer are not currently selectable, and
recognizing a position of an object image displayed on the screen of the display, and determining a display position of the menu image so as not to overlap the object image with the menu image, wherein
the selection items are arranged in a circular pattern,
the positions of the selection items arranged in the circular pattern are rotated and moved around a center of the circular pattern,
when the lower layer is displayed, a rotation of the menu image of the higher layer than the layer that is displayed at the last is stopped, and
when one of the circularly arranged selection items is selected, selection items of the lower layer are linearly arranged with the selected selection item as a base point, and
the menu image is displayed at the determined display position.

10. The non-transitory computer readable medium according to claim 9, wherein
the menu image is generated as a video file where the selection items are rotated and moved on a predetermined circumference, and
the video file of the menu image is replayed on the screen of the display so as to make the positions of the selection items changed.

11. The non-transitory computer readable medium according to claim 9, wherein a plurality of the menu images are generated in which the selection items are arranged at different positions within a certain area and
the menu images are displayed on the screen of the display while switching the plurality of the menu images so as to make the positions of the selection items changed.

12. The non-transitory computer readable medium according to claim 9, wherein the menu image is generated on the basis of combination of images for each of the selection items that is individually generated, and
arrangement positions of the selection items of which the number is the same or more as the number of the selection items are set, and the selection items to be displayed at each of the arrangement positions are sequentially switched so as to make the positions of the selection items changed.

13. The non-transitory computer readable medium according to claim 9, a change speed of the positions of the selection items is dynamically changed.

14. The non-transitory computer readable medium according to claim 9, wherein, when one of the linearly arranged selection items is selected, selection items of the further lower layer are arranged in a circular pattern with a position of the selected selection item as a new center.

15. The non-transitory computer readable medium according to claim 9, wherein:
when a second selection is made from the selection items of the lower layer that are linearly arranged, displaying a first menu of the selection extending linearly to one of a left direction and a right direction of the selection items of the lower layer that are linearly arranged,
when a third selection is made from the first menu that extends linearly, displaying a second menu extending linearly to one of a left direction and a right direction of the first menu, and
the first menu and the second menu extend in the left and right directions alternately.

16. The non-transitory computer readable medium according to claim 9, wherein:
the menu image on the screen is displayed so that the positions of the selection items in the menu image are dynamically changed in front of a plurality of users that surround the screen of the display such that selection of the selection items can be made from different directions around the display, and
the positions the selection items arranged in the circular pattern dynamically change such that every selection item comes to a front side of each user for a certain interval of time.

\* \* \* \* \*